(12) United States Patent
Skjoldhammer

(10) Patent No.: US 10,619,620 B2
(45) Date of Patent: Apr. 14, 2020

(54) APPARATUS FOR HARVESTING ENERGY FROM WAVES

(71) Applicant: NOVIGE AB, Västerås (SE)

(72) Inventor: Jan Skjoldhammer, Stocksund (SE)

(73) Assignee: NOVIGE AB, Västerås (SE)

( * ) Notice: Subject to any disclaimer, the term of this patent is extended or adjusted under 35 U.S.C. 154(b) by 0 days.

(21) Appl. No.: 16/218,510

(22) Filed: Dec. 13, 2018

(65) Prior Publication Data

US 2019/0186459 A1 Jun. 20, 2019

Related U.S. Application Data

(63) Continuation of application No. PCT/SE2017/050623, filed on Jun. 12, 2017.

(30) Foreign Application Priority Data

Jun. 13, 2016 (SE) ...................................... 1650826

(51) Int. Cl.
*F03B 13/18* (2006.01)
*F03B 13/22* (2006.01)

(52) U.S. Cl.
CPC ........ *F03B 13/1875* (2013.01); *F03B 13/187* (2013.01); *F03B 13/189* (2013.01); *F03B 13/22* (2013.01); *F05B 2240/95* (2013.01); *F05B 2260/406* (2013.01); *Y02E 10/38* (2013.01)

(58) Field of Classification Search
USPC ............ 290/42, 53; 60/497, 500, 501; 441/1
See application file for complete search history.

(56) References Cited

U.S. PATENT DOCUMENTS

| | | | | |
|---|---|---|---|---|
| 3,870,893 A | * | 3/1975 | Mattera | F03B 13/183 290/53 |
| 4,271,668 A | * | 6/1981 | McCormick | F03B 13/142 415/68 |
| 4,392,061 A | * | 7/1983 | Dubois | F03B 13/22 290/53 |
| 4,441,316 A | * | 4/1984 | Moody | F03B 13/142 415/7 |
| 6,216,455 B1 | * | 4/2001 | Doleh | F03B 13/148 290/53 |
| 6,392,314 B1 | * | 5/2002 | Dick | F03B 13/148 290/53 |

(Continued)

*Primary Examiner* — Pedro J Cuevas
(74) *Attorney, Agent, or Firm* — Gabriela B. Tomescu, Esq.; Bergenstråhle & Partners, AB

(57) ABSTRACT

Apparatus comprising a floating platform, a cylinder connected thereto, and a piston having a piston rod connected to a mooring at the sea floor. At least one penstock tube is in fluid connection at its lower end with a lower portion of the cylinder, below the piston. The penstock tube being provided along the cylinder and has an opening at the upper end arranged so that water pumped upwards in the at least one penstock tube will hit a water turbine arranged above the cylinder. The water turbine being in connection with a generator. The cylinder has an opening in an upper portion and in the lower portion thereof, provided with a one-way valve allowing water into the lower portion of the cylinder while the cylinder moves downwards, and when the platform rises, water will be refilled in the upper section through the opening.

13 Claims, 9 Drawing Sheets

(56) References Cited

U.S. PATENT DOCUMENTS

| | | | | |
|---|---|---|---|---|
| 6,857,266 B2* | 2/2005 | Dick | B63B 35/44 | 60/496 |
| 7,322,189 B2* | 1/2008 | Talya | F03B 13/142 | 60/496 |
| 7,476,137 B2* | 1/2009 | Stewart | F03B 13/1815 | 290/42 |
| 7,785,163 B2* | 8/2010 | Spencer | B63B 22/00 | 114/294 |
| 7,878,734 B2* | 2/2011 | Bull | B63B 35/4406 | 405/76 |
| 7,909,536 B2* | 3/2011 | Dick | B63B 35/44 | 405/76 |
| 8,049,356 B2* | 11/2011 | Chervin | F03B 13/20 | 290/53 |
| 8,067,849 B2* | 11/2011 | Stewart | F03B 13/16 | 290/53 |
| 8,093,736 B2* | 1/2012 | Raftery | F03B 13/1885 | 290/42 |
| 8,123,579 B2* | 2/2012 | Gerber | B63B 22/00 | 114/121 |
| 8,207,622 B2* | 6/2012 | Koola | F03B 13/142 | 290/42 |
| 8,317,555 B2* | 11/2012 | Jacobsen | B63C 11/52 | 114/312 |
| 8,421,259 B2* | 4/2013 | Ardoise | F03B 13/1865 | 290/42 |
| 8,508,063 B2* | 8/2013 | Rhinefrank | F03B 13/20 | 290/53 |
| 8,784,653 B2* | 7/2014 | Murtha | B01D 24/042 | 210/170.11 |
| 8,826,658 B2* | 9/2014 | Foster | F03B 13/189 | 60/504 |
| 8,866,321 B2* | 10/2014 | McCormick | F03B 13/20 | 290/42 |
| 8,912,677 B2* | 12/2014 | Dehlsen | E02B 9/08 | 290/53 |
| 9,410,559 B2* | 8/2016 | VanWalleghem | F17C 1/007 | |
| 9,624,899 B2* | 4/2017 | Foster | F03B 13/20 | |
| 9,648,777 B2* | 5/2017 | Finn | H05K 7/1497 | |
| 9,656,728 B2* | 5/2017 | Mundon | B63B 22/20 | |
| 9,839,160 B2* | 12/2017 | Finn | H05K 7/1497 | |
| 9,863,395 B2* | 1/2018 | Rohrer | F03B 13/182 | |
| 9,957,018 B1* | 5/2018 | Angeliev | H02J 1/00 | |
| 10,094,356 B2* | 10/2018 | Rohrer | F03B 13/1815 | |
| 10,240,575 B2* | 3/2019 | Dragic | F03B 13/1855 | |
| 10,352,290 B2* | 7/2019 | Kang | F03B 13/20 | |
| 10,352,291 B2* | 7/2019 | Nair | H02N 2/00 | |
| 10,359,023 B2* | 7/2019 | Murtha, Jr. | F03B 13/20 | |
| 10,393,089 B2* | 8/2019 | Mundon | F03B 13/189 | |
| 2005/0123353 A1* | 6/2005 | Dick | B63B 35/44 | 405/75 |
| 2006/0208494 A1* | 9/2006 | Cook | F03B 13/20 | 290/53 |
| 2007/0137195 A1* | 6/2007 | Tayla | F03B 13/142 | 60/497 |
| 2008/0012344 A1* | 1/2008 | Buffard | F03B 13/187 | 290/53 |
| 2008/0169653 A1* | 7/2008 | Olson | F03B 13/1815 | 290/53 |
| 2009/0085357 A1* | 4/2009 | Stewart | F03B 13/16 | 290/53 |
| 2009/0206608 A1* | 8/2009 | Koola | F03B 13/142 | 290/53 |
| 2010/0213710 A1* | 8/2010 | Rhinefrank | F03B 13/20 | 290/42 |
| 2011/0012358 A1* | 1/2011 | Brewster | F03B 13/1885 | 290/53 |
| 2011/0062713 A1* | 3/2011 | Ardoise | F03B 13/1865 | 290/53 |
| 2011/0068578 A1* | 3/2011 | Chervin | F03B 13/20 | 290/53 |
| 2011/0113771 A1* | 5/2011 | Foster | F03B 13/189 | 60/501 |
| 2011/0304144 A1* | 12/2011 | Dehlsen | E02B 9/08 | 290/53 |
| 2013/0127168 A1* | 5/2013 | Dragic | F03B 13/1855 | 290/53 |
| 2013/0160444 A1* | 6/2013 | Foster | F03B 13/20 | 60/497 |
| 2013/0341927 A1* | 12/2013 | Murphree | F03B 13/20 | 290/53 |
| 2015/0082785 A1* | 3/2015 | Rohrer | F03B 13/182 | 60/500 |
| 2015/0194813 A1* | 7/2015 | Finn | H05K 7/1497 | 307/19 |
| 2016/0003214 A1* | 1/2016 | Mundon | F03B 13/22 | 290/53 |
| 2016/0023721 A1* | 1/2016 | Mundon | B63B 22/20 | 290/50 |
| 2017/0002789 A1* | 1/2017 | Nair | F03C 1/00 | |
| 2017/0009732 A1* | 1/2017 | Mundon | H01L 41/125 | |
| 2017/0022964 A1* | 1/2017 | Rohrer | F03B 13/1815 | |
| 2017/0145984 A1* | 5/2017 | Matthews | B01D 61/025 | |
| 2017/0164521 A1* | 6/2017 | Finn | H05K 7/1497 | |
| 2018/0164755 A1* | 6/2018 | Abdelkhalik | G05B 11/38 | |
| 2018/0306165 A1* | 10/2018 | Rohrer | F03B 13/182 | |
| 2019/0063395 A1* | 2/2019 | Hagmuller | F03B 13/1885 | |
| 2019/0085817 A1* | 3/2019 | Fait | A01M 29/16 | |
| 2019/0145372 A1* | 5/2019 | Skjoldhammer | F03B 13/14 | 405/76 |
| 2019/0145373 A1* | 5/2019 | Lehmann | F03B 13/148 | |
| 2019/0151798 A1* | 5/2019 | Lafortune | B01D 61/025 | |
| 2019/0186459 A1* | 6/2019 | Skjoldhammer | F03B 13/22 | |
| 2019/0271292 A1* | 9/2019 | Noyek | F03B 13/20 | |
| 2019/0285044 A1* | 9/2019 | Dragic | F03B 13/186 | |
| 2019/0331085 A1* | 10/2019 | Mundon | F03B 13/1895 | |

* cited by examiner

US 10,619,620 B2

APPARATUS FOR HARVESTING ENERGY FROM WAVES

This application is the continuation of International Application No. PCT/SE2017/050623, filed 12 Jun. 2017, which claims the benefit of Swedish Patent Application No. SE 1650826-9, filed 13 Jun. 2016, the entire contents of which are hereby incorporated by reference.

The present invention concerns the power take-off system to be used in a Wave Energy Converter (WEC) of the point absorber type. The floating platform/buoy/lifting device may be of several designs, shapes and sizes. We will hereafter refer to it as a floating platform.

The tremendous forces in sea waves as a potential for extracting electrical energy, is well known. The weight of water in relation to air is 830/1, which shows that in a much lesser area, the same or better effect as wind power can be extracted. This also applies even as the wind velocity in average is higher than the vertical wave speed of waves.

The best numbers for cost/efficiency of existing wave power systems are today about 80% higher than wind power. The wave power converters that exist give an average power per unit from about 30 to 300 KW at most. This combination explains the very moderate interest among commercial investors. Several investors and developers have burnt their fingers trying to make these other systems economically viable. Time and time again they have been coming short because of structural and reliability problems in harsh weather, complex systems with many parts, rising costs, as well as fundamentally wrong theories from the start. A system giving only 100 MW still requires planning, installation, service hours and monitoring. A much stronger performing unit will proportionally have much lower cost per MW in these aspects, mostly because of less man hours and less equipment needed per MW relatively. This is the reason wind power units have grown from 1 MW rated power to 8 MW rated power.

It seems that the reason other wave power system can give so low power output is twofold. Firstly, many previously known systems do not have an attachment to the sea floor. Then they have to base the power output only on gravity and Newton's Law, without the latching effect one can have with a point absorber. The previously known point absorbers having a latching solution are too small, combined with complex and costly machinery, which make them economically less efficient than wind power.

The aim is to provide a concept that will be a major achievement towards reducing CO2 emissions, as it will be able to compete at large with fossil fuel costs. In the best of worlds, this means energy producing companies can replace even coal energy plants with this system, at similar costs, and thereby contribute on a large scale in this very important challenge for mankind.

SUMMARY OF THE INVENTION

According to a first aspect of the present invention, an apparatus for harvesting energy from waves, of the wave energy converter of the point absorber type, is provided. The apparatus comprises a floating platform, a cylinder connected thereto, and a piston having a piston rod connected to a mooring at the sea floor. At least one penstock tube is in fluid connection at its lower end with a lower portion of the cylinder, below the piston. The at least one penstock tube is provided along the cylinder and has an opening at the upper end arranged so that water pumped upwards in the at least one penstock tube will hit a water turbine arranged above the cylinder and the water turbine being in connection with a generator. The penstock will preferably be relatively straight and alongside the cylinder as a tube or large pipe, but may as well have other shapes, for example winded around the cylinder.

According to an embodiment the cylinder is connected via a swivel coupling to the floating platform. The swivel may be able to rotate around one or more axes.

According to an embodiment the piston is movable up and down from a middle position in the cylinder. Preferably, the cylinder has at least one opening in fluid connection with the surrounding water in an upper portion and in the lower portion thereof, respectively.

According to an embodiment the at least one opening in fluid connection with the surrounding water is provided with a one-way valve allowing water into the lower portion of the cylinder while the cylinder moves downwards and thus the piston moves upwards relative the cylinder.

According to an embodiment the at least one opening in fluid connection with the surrounding water is provided with a screen or filter.

According to an embodiment the fluid connection between the cylinder and the at least one penstock tube comprises at least one one-way valve allowing water to flow from the cylinder to the penstock tube.

According to an embodiment at least two penstock tubes are provided on opposite sides of the cylinder. Preferably, the upper openings of the at least two penstock tubes are provided at different levels so that water from at least one first opening at a first side of the water turbine will hit buckets at the top of the water turbine and water from at least one second opening at a second side of the water turbine will hit buckets at the bottom of the water turbine, or vice versa.

According to an embodiment one or more penstock tubes are connected to a vertical axis hydro turbine (the runner wheel positioned flat), the turbine laying directly on top of the cylinder, although with room for water escape. The hydro turbine may have from one to several nozzles, as well as from one to several runners. In this embodiment, the generator may be positioned directly on top of the hydro turbine.

According to an embodiment the at least one penstock tube has a spear valve in its upper opening. Thus, it is possible to regulate the water flow and pressure out of the upper opening of the penstock. Other adjustable nozzles than a spear vale is also possible. A fixed size nozzle or orifice is also an option, especially for smaller and cheaper installations, although resulting in lower efficiency.

According to an embodiment the at least one penstock tube has a pressure valve in its upper opening. Preferably, the valve will open at a determined pressure letting water in the penstock out. It is preferred to have a pressure valve that is of a one-way type.

According to an embodiment the water turbine is a Pelton turbine. According to an embodiment a coupling is provided between the water turbine and the generator. Preferably, a flywheel is provided between the water turbine and the generator. In case of a vertical axis hydro turbine with the generator mounted on top, one embodiment would be to have one flywheel directly below the lower runner wheel, as well as one on top of the generator, According to an embodiment the floating platform is at least 1 meter×20 cm for private use. For commercial deployment, sizes up to 140 meters length and a lifting force of more than 4000 tons is possible with today's materials. This will be increased with time.

In short one might describe the invention as a cylinder pump where the piston rod is attached to a weight standing on the sea floor, the cylinder is attached to the floating platform, the pressurized water being streamed upwards to a turbine, driving a generator. The water flow is being regulated via one way valves on the cylinder, as well as one or more nozzles facing the turbine, regulating the pressure and subsequently the speed of the water hitting the turbine. The pressure may range from 0 to 200 bar, ideally from 20-100 bar in the lifting phase, being reduced to about zero in the descending phase. It is possible to think of it as an inverted waterfall, since it pressurizes water in a penstock/tube, on a scale similar to Hydro Power stations having a fall ranging from 50 to several hundred meters, thereafter running a water turbine. (10 bars being about equal to 100 meters water fall).

As the principle will work in any size, this invention is relevant from half a meter cylinder's length and can actually be used in a bay outside a summer cabin. Like ways, cylinder lengths of 40 meters at 60 meters' depth or more, lifting 4000 tons, will be conceivable, too, since the principle is the same. The attachment to the sea floor may be a weight or an arrangement drilled into the sea floor structure.

The material in the cylinder, penstock as well as the piston, may be of several materials, composites though being of preference. One or more cylinders may be used for each floating platform. The cylinder may be attached to the platform either fixed or with a flexible joint, the latter being of preference, to be able to adjust to the rolling wave movement.

The one way valves and nozzle(s) may be opened or closed with the direction of water flow and/or fixed pressure settings, but may also be controlled electrically through sensors as well as computer controlled.

The water turbine is ideally a Pelton turbine, but the concept will also work with other water turbines. The size of the turbine wheel as well as the number of runner wheels, buckets, nozzles/spear valves as well as control systems, may vary. A flywheel is desirable but not required. This, as well as the size of the flywheel, depends on the generator type, grid voltage and size plus number of units installed in the same area.

The generator and control systems will vary, depending upon the size of the system, the user, as well as the grid connection. A variable speed induction generator with power converter is one relevant option.

The piston rod is connected to the mooring weight, inside a hollow strut, by thread or a clamshell solution, for example, which is favourable both for installation and decoupling due larger maintenance/service. There will be filters or screens around various water openings to avoid contamination of the system.

Depending on the floating platform layout, size and whether the cylinder is flexibly or fixedly attached to it, a prop shaft between the water turbine and the generator (via the flywheel if present), is desirable, but not a must. The prop shaft may have a spline coupling, too.

The platform should preferably be held in an approximate position by mooring lines and anchors on the sea floor, but will also function with the cylinder and piston rod as the only attachment. In contrast to other existing systems, the present invention concept, combined with larger floating platforms, can with today's newer composite materials, give incredible average performance figures up to 9 MW per unit, 90 times more than the more common systems and many times more than the best performing competition.

The world's largest offshore wind power units, being the most economical, rages 220 meter-high and has a turbine diameter of 165 meter, giving at most an average of 3.3 MW output. The total weight is about 6000 tons whereof 1900 tons is based 140 meters above sea. A system according to the present invention having similar performance, weighs about 1700 tons, whereof 1500 tons consist of a simple sea floor weight, chains and anchors. Only 220 tons comes from the platform and machinery, a fraction of a wind power plant. Installing the wind power unit is extremely more complex than the present inventive system. Since the height is so much lower than wind power, the concept will be invisible from shore at a distance of 7 km, much shorter than the 52 km needed for wind power to be the earth's curvature. This explains the often 30-50 km distance from land they are normally located. Combined with the fact that the concept is so much simpler to install and remove in the future, the number of permissible locations are of a far better magnitude. To make the platform more visible for other vessels, a spray fountain may be arranged on top, needing only a very minor portion of the pressurized water to operate. As the concept may be close to shore, it is quite possible this addition will make it more popular amongst neighbours. A sight-able gage on deck showing the output would also add to the popularity.

The cost for a wind power unit this size, installed, is roughly 200 M SEK. The cost for the present inventive system combined with a larger floating platform is estimated to be 60-35% of above mentioned wind power units, calculated in relation to cost per produced MW. The percentage cost drops with increasing size. The numbers are even more favourable when compared to rated power. Running cost should at most be similar to wind power per produced MW. The above statements are made to show the importance of getting this under-way, as well as to show differences as to what else is available today.

SHORT DESCRIPTION OF THE DRAWINGS

The invention will now be described in more detail by means of exemplifying embodiments under referral to the drawings, in which.

DETAILED DESCRIPTION OF THE INVENTION

All illustrations of the drawings are for the purpose of describing selected embodiments of the present invention and are not intended to limit the scope of the present invention.

Figure 1:
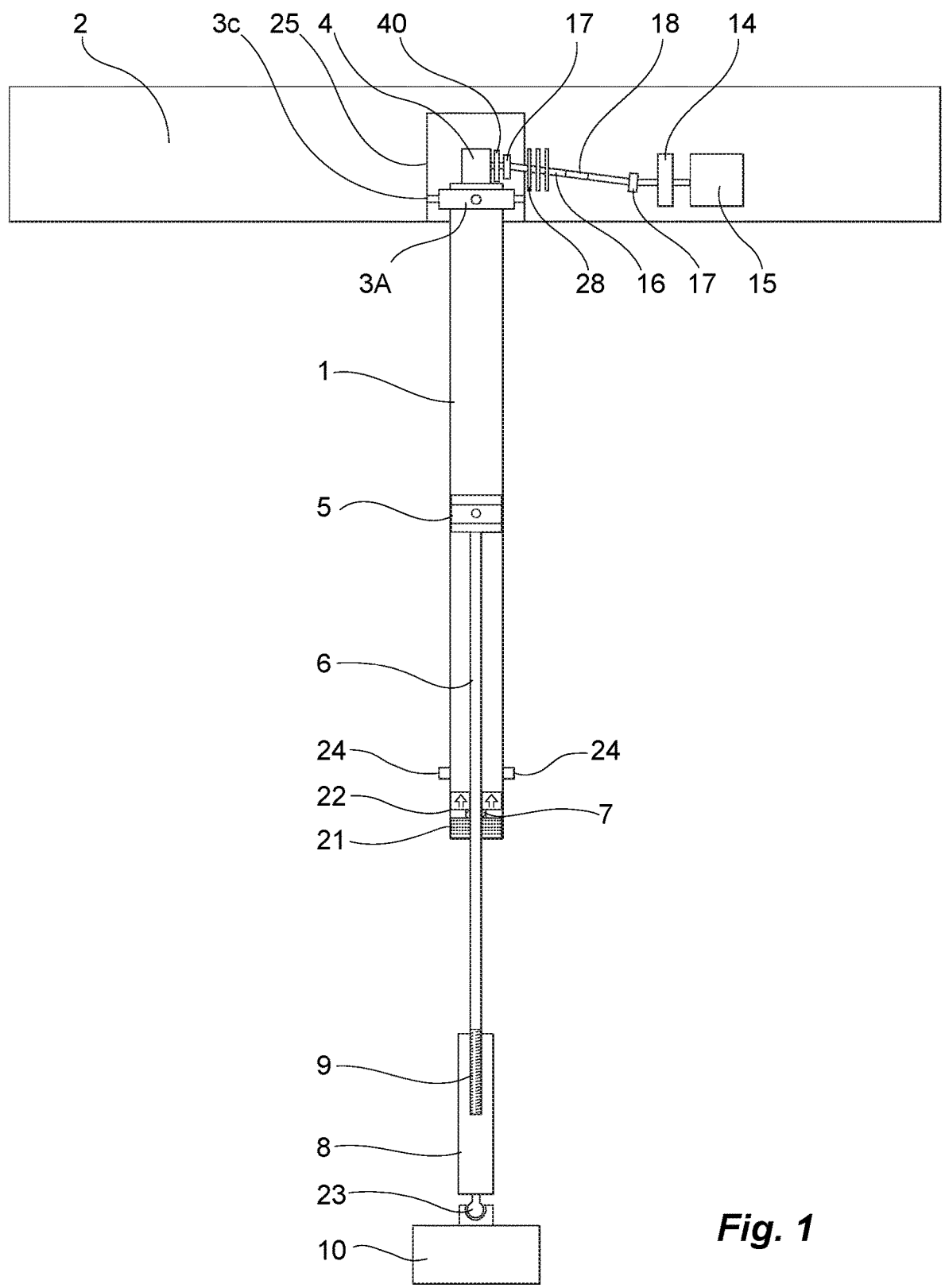
FIG. 1 shows an embodiment of the inventive apparatus, combined with a floating platform, in a view showing the platform's long side, the one facing the waves.
Figure 2:
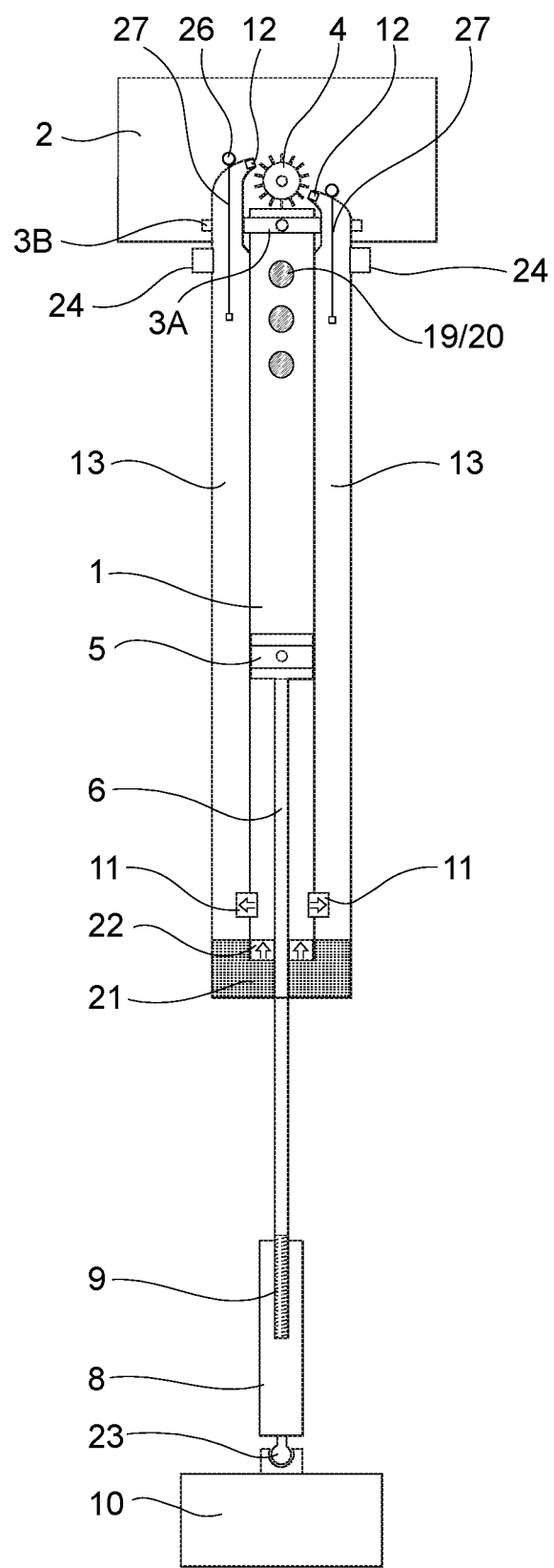
FIG. 2 shows the inventive apparatus of FIG. 1, combined with the platform, in a view showing the platform's short side.

The present invention concerns a power take-off apparatus to be used in a Wave Energy Converter (WEC) of the point absorber type. In FIGS. 1 and 2 an embodiment is shown having a cylinder 1 which is attached to a floating platform 2, either fixed, or preferably, hanging in a free swivel arrangement 3, see also FIG. 3. The swivel 3 may operate in one or more axis. The length of the cylinder 1 can be from ½ meter, up to more than 40 meters for areas with high waves and occasional monster waves. The diameter of the cylinder 1 should preferably be around 1/10-1/15 of the length, if the very occasional monster waves are to be accounted for, but will work perfectly with other ratios as well. The latter depending on the float area. As a general rule, monster waves can be up to ten times the normal wave height, meaning in practical life that on the Atlantic coastline, the available stroke length should be 15 meters in each direction, 30 meters in total. Cylinder total length should then be 35-40 meters. The piston rod length will be of similar length, or more in deeper water. As can be seen in the figures the float area is many times the cylinder area in order to increase the pressure in the water pumped to a water turbine 4. Thus, the larger ratio the more pressure may be achieved. This ratio will depend on the optimum combination of flow and pressure to the specific tubine(s) selected for the specific installation, as well as the wave heights in the specific location.

The material of the cylinder 1, piston 5, piston rod 6 and strut 8, can be of several options, such as metal or polymer composite material comprising reinforcing fibres, for example. Sandwich composites are one good alternative, since it is extremely strong and thin in relation to weight, does not corrode or breakdown in salt water, is easy to produce in various shapes and strengths, as well as being price-worthy. Installation is also easier due to the lower weight.

Above the cylinder 1, a water turbine 4 is mounted, preferably of the Pelton type or similar principle. The Pelton Turbine has the advantage of being able to work out of water, as well as giving excellent performance under a relatively wide range of pressure and flow rate. The lifetime in regular hydro power stations are more than thirty years. For salt water use, a slightly different grade of stain less steel should be used, to avoid pitting of the buckets and other parts of the turbine 4. Adding 2% molybdenum is a common method. Otherwise an off the shelf turbine concept may be used.

The reason for mounting the turbine 4 directly above of the cylinder 1, is to avoid having any flexible tubes with a more limited lifetime and to directly use the power of the water pressure in order to decrease power losses. Thus, the penstocks are hard.

Figure 4:
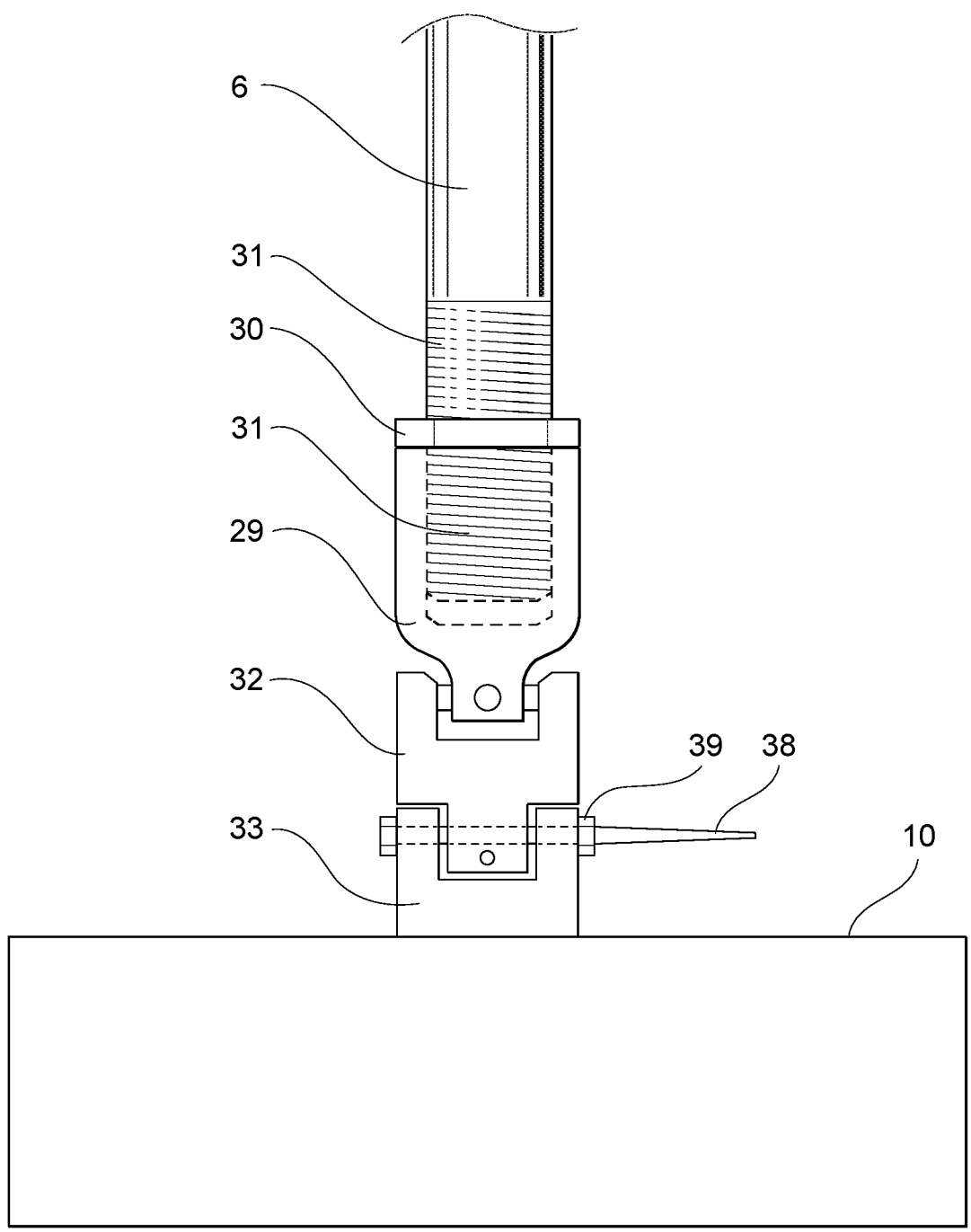
FIG. 4 shows an embodiment of a lower portion of a piston rod and its connection to a mooring weight.
Figure 5:
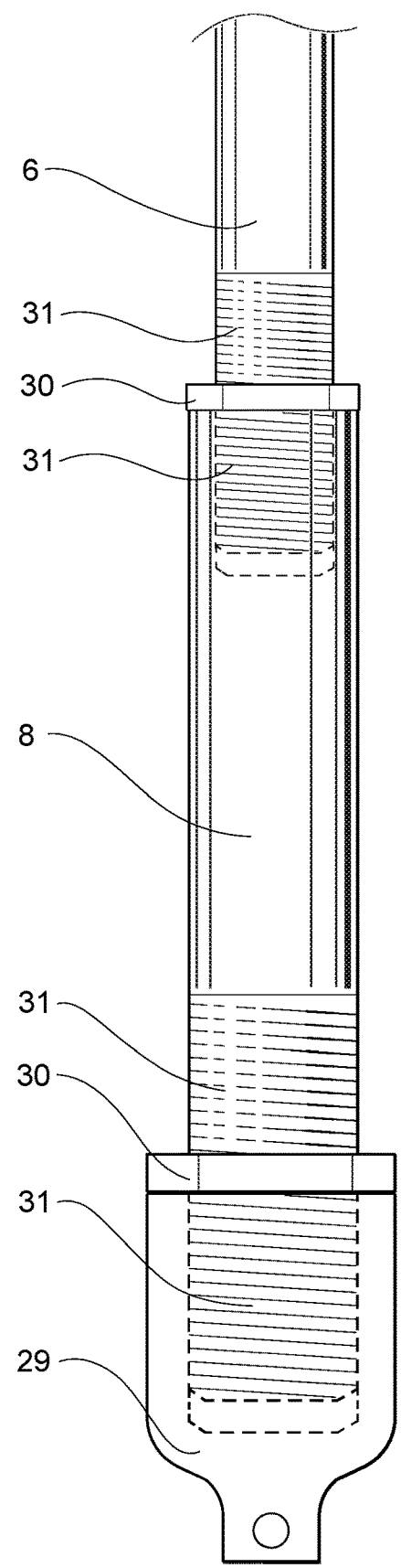
FIG. 5 shows an embodiment of a lower portion of a piston rod and its connection to a mooring weight, with the addition of a strut between the piston rod and the U-joint.

Inside the cylinder 1, a piston 5 is present, preferably having piston rings suitable to work with the chosen cylinder material. As the up and down strokes mostly will shift direction every 2-4 seconds, plus the speed being 0.5-1.5 meters per second, the piston rings do not have to seal perfectly. This because the volume and speed of the water will be little affected by a minor compression leakage. The piston 5 is connected to a piston rod 6, which slides in a bushing 7, at the lower end of the cylinder 1. The purpose of this bushing 7 is to keep the piston rod steady in the centre of the cylinder 1. The piston rod 6 is connected at the lower end to a hollow strut 8 or directly to the upper portion of a U-joint 29. The piston rod 6 is locked to the strut 8 or U-joint 29 with treads 31 and a locking nut 30, as in FIGS. 4 and 5, or by a clamshell concept, indicated in FIGS. 1 and 2. Flanges that meet and are tightened by large bolts, are another option. If a strut 8 and treads 31 is used, it goes inside the upper portion of the U-joint 29 as depicted in FIG. 5, see more in below description. Other solutions, as long as they can be adjusted to relevant location depths and to a U-joint, are also possible The piston rod 6 or strut 8 is in turn connected to a mooring weight 10 standing on the sea floor, alternatively a screw or rod may be drilled and cemented into the sea floor rock. A flexible U-joint 23 is mounted between the weight 10 and the strut 8. The principle of the U-joint being the same as in any socket wrench set or auto-mobile prop shaft.

As the platform 1 moves upwards with a wave, the cylinder 1 moves with it, while the piston 5 stands still. The water mass around the piston 5 also stands still. The only water that moves is the water being compressed and squeezed out of at least one one-way valve 11 in the lower portion of the cylinder 1, as well as mainly horizontal refill in the upper portion of the cylinder 1 through at least one opening 19. In other words, the overwhelming majority of the water is standing still in relation to the surrounding water, meaning that there will only be minor energy drawn for this work. There can be one or more one-way valves 11.

The pressurized water will flow through the at least one one-way valve 11 into and upwards in at least one penstock tube 13, in the shown embodiment two penstock tubes arranged on opposite sides outside the cylinder 1, parallel with the cylinder 1. It is conceivable to arrange at least one penstock tube 13 inside the cylinder, too, although the piston 5 must be redesigned. At least one spear valve 12 or another valve with similar cutoff/on function, is arranged in an upper opening of the penstock tube 13, possibly in combination with a separate pressure valve, and they will open when a specific pressure is obtained. Thus, the water will flow out of the spear valves 13 at high speed, hitting the buckets of the water turbine 4, driving the turbine at an optimum speed. The spear valve, which controls the pressure and flow of water hitting the buckets, might have to be slightly strengthened, as the number of movements will be higher than in regular use. A separate pressure valve just before the spear valve might be an option to relieve a standard spear valve of wear and tear. A turbine may operate with fixed nozzles instead of spear valves, especially if having multiple nozzles, and will therefore use the separate pressure valve to let pressurized water into an inlet ducting provided around the turbine.

According to a specific embodiment a small electrical water pump 26, combined with a one way valve, may supply constant water supply at the highest points on the penstock (s). A supply line 27 may run along the penstock down to below sea level. As the spear valve and/or pressure valve at the upper opening towards the water turbine does not close completely airtight, the electrical water pump will avoid air pockets to form during return stroke. The water turbine 4 is connected to a generator 15. The connection may preferably be a prop shaft 16. An optional flywheel 14 may be arranged between the water turbine 4 and the generator 15. The optimum pressure of the water coming from the penstock 13 will depend upon the size and lifting force of the floating platform 2, the wave height and wave speed, the cylinder diameter as well as the resistance in the flywheel 14 and the generator 15. As the pressure will come onto the turbine 4 with high force during each heave motion, the generator 15 will experience a rather rapid acceleration force, even if dampened by the flywheel 14. This may be dampened by a torsion or torque coupling between the turbine 4 and the generator 15, similar to solutions in wind power applications.

As the platform 2 might be moving in a different pattern than the cylinder 1, a flexible connection to the generator 15 is needed. This is done by the prop shaft 16, having U-joints 17 in both ends or near the ends. Preferably a spline 18 is provided in the middle area. In this way, the U-joints 17 will take care of the frequent and larger movements of the waves hitting the long side of a rectangular platform 2, while the spline 18 will handle the smaller movements when waves move the platform from the short side. When the angle of the U-joints 17 increases, this will have as an effect that the rotation speed will vary slightly with each revolution. The generator 15 might be prematurely worn by this, whereby a torsion or torque coupling in connection with the prop shaft, similar to concepts used in wind power applications. The generator 15 should preferably be placed in a lower section of the platform 2. It is also possible to mount the generator 15 directly attached to the turbine, given enough room and the extra weight accounted for. As the strain on the swivel arrangement 3 is so large due to the lift resistance, the extra weight of a generator will make a small impact.

Figure 7:
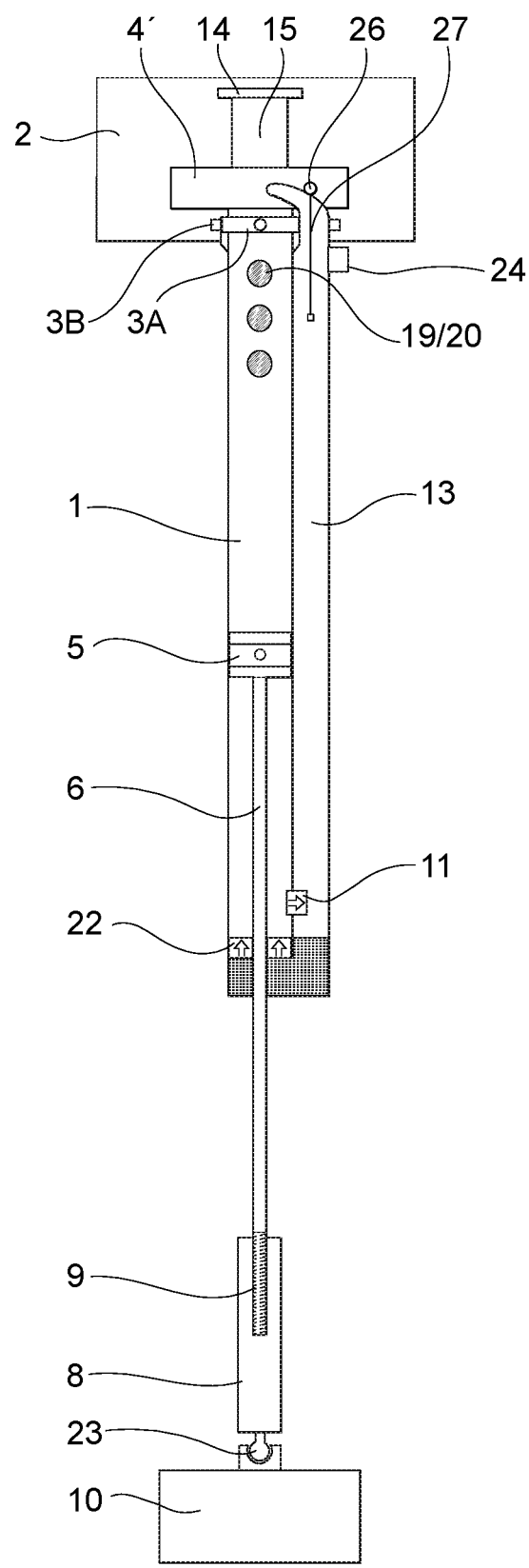
FIG. 7 shows an embodiment of the present invention from a short side of a combined platform.

One option with this solution is to use a vertical axis hydro turbine 4' (the runner wheel positioned flat), the turbine laying directly on top of the cylinder 1, although with room for water escape, ref FIG. 7. The hydro turbine 4' may have from one to several nozzles, as well as from one to several runners. In this embodiment, the generator 15 may be positioned directly on top of the hydro turbine 4'. In this set up, a flywheel 14 directly below the lower runner wheel, as well as one on top of the generator 15, may be a practical solution.

When the platform rises, water will need to be refilled in the upper section of the cylinder 1. This is done through large openings 19 in the upper portion. To avoid fish and other sea organisms, as well as debris floating in the ocean, filters or screens 20 are installed outside these openings. The size of the filters masking 20 will depend on the local area. Most likely the filter 20 will be larger than depicted, as the depicted filter area will slow the water speed. A more cage-like device provided outside the openings would thereby allow smaller holes, but still allow sufficient flow of water due to the increased surface size, which again will allow less fragments into the cylinder. A one-way flapper valve is an additional option, so that there is no filter when blowing outwards.

The position of the holes 19 are relatively high up in the cylinder 1. The position should be so that more than 95% or so of the wave heights are not affected by the holes 19. When the waves at seldom time cause the piston to go past these, efficiency is lost only in this area, while normal performance will be available below.

When the platform 2 sinks down towards the wave trough, water must be refilled in the lower portion of the cylinder 1. This is done by water first passing at least one filter or screen 21, then passing at least one one-way valve 22. There can be one or more one way valves 22. The direction of flow is shown by small arrows in all one way valves. Also here the filters 21 may be larger in size than depicted, i.e. the total area of the screen being larger, not to slow down the water and thereby allowing smaller size masking. This means basically that as long as the masking is of less size than the spear valve opening, any debris coming into the cylinder, will be blown out through the spear valve orifice. Most non organic pollutant of any size is normally floating on the surface or sinking to the bottom, meaning that at typically 20-40 meters' depth, there will be mostly organic substances, which not will be trapped for long inside the cylinder 1 or penstock 13. The outside of the cylinder 1 and platform 2 may be coated by antifouling paint. The dark inside of the cylinder will not attract much organic life to grow. Competent consultant in this field states that this will be of n-e little or moderate problem, as the organic life is attracted to lighter areas. Treatment with ceramic coatings will further contribute positively in favour of less organisms being attracted to the cylinder walls. The piston may nevertheless have upper and lower scrape rings to remove residuals that will grow on the cylinder wall. As the stroke length in normal operation will be much lower than maximum length, residuals in the upper and lower area may need to be cleaned away at intervals. This might be done by releasing the joint 23 and move the piston for the whole distance up and down. Having divers doing it manually is one option as well, for instance with high pressure water. A third option is to mount an extra scrape piston of small height but the same diameter, in the lower and upper area, and from time to time move them towards centre. A fourth option would be movable high pressure water nozzles or robots, steered from the outside by divers or from remote controls on board.

When the platform 2 sinks downwards, water above the piston will escape through the large openings 19, with relatively small resistance. This outward blow will contribute to keeping filters 19/20 clean from debris and residuals.

It is possible to provide overpressure relief valves 24 both in the lower section of the cylinder 1, as well as in the top section of the penstock 13.

Figure 3:
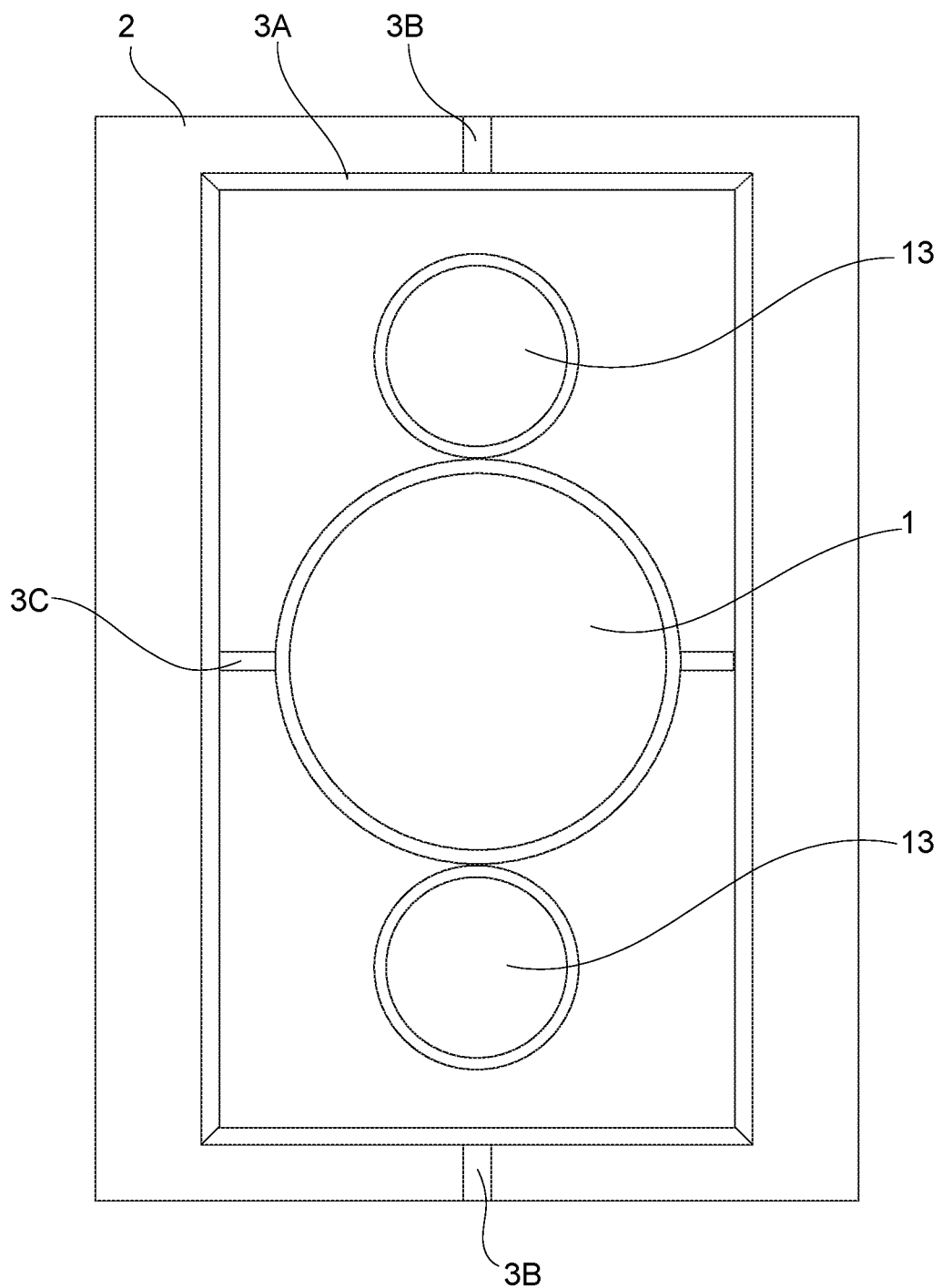
FIG. 3 shows an embodiment of a swivel arrangement from above.

The swivel arrangement 3, as depicted in FIG. 3, is of the same principle as in a boat compass or a gyro. In the platform 2, there is a wet room with walls 25 depicted in FIG. 1. Large bolts with bearings will be installed in the walls of the wet room 25. These will be bolted to the frame 3A which then is free to swivel in one direction. Bolts and bearing 3C will be mounted between the frame 3A and the cylinder 1 as well. The bearings can be on both sides or either side of the bolt, the principle is the same. In this way, the cylinder 1 is free to move both back and forth plus sideways. The swivel 3 may be provided according to the solution depicted in the drawing but may also function well with one bearing on each side of the cylinder, connected to the platform 2, giving freedom of movement only in one axis.

The wet room will have drainage from the water flow hitting the buckets, by an open area outside the cylinder 1. As some water might leak into the platform 2 from where the prop shaft goes through the wet room wall 25, a drainage and possibly a bilge pump is preferred in this area. A circular deflector plate/disc 40 mounted directly on the prop shaft, between the pump and the wall 25, will stop most of the water splash initially. Three walls 28 in sequence with a common lower outlet, behind the plate/disc 29, will further minimise water coming into the inside of the platform 2. Due to gravity and the consequent curve of the water spray, water splash will often hit one of the three walls.

As the water depths in the areas relevant for installation will vary, the length of the piston rod or strut or both needs to be variable. The location depth should preferably be more than 1.3 times the highest probable monster wave in the relevant area, as one then will avoid damaging breaking waves, and the water instead will have so called deep water wave character, at the location. 50 meters or more will be a conservative figure for the Atlantic coastline.

It is preferred to have a flexible system for adjusting the length of the piston rod 6, the target being to have the piston 5 approximately in the centre position in low waves/average wave height. This can be done in several ways. One is by having a selection of different piston rod 6 lengths available, and mounting the piston rod directly into an upper portion 29 of a U-joint 23, see FIG. 4. With this concept, the threaded 31 lower end of the piston rod 6, goes into the upper portion 29 of the U-joint. A locknut 30 keeps the position static so as not to wear out the treads.

A different option is to have a strut 8, as in FIGS. 1, 2 and 5, in between the piston rod 6, and the upper portion 29 of the U-joint 23. With this solution one will have for instance only one or two lengths of piston rods 6, but a selection of different lengths of the strut 8. The threads 31 on the piston rod 6 as well as in the strut 8, may be of several meters, to further adjust exactly to the desired length. In this option, the piston rod 6 is screwed to desired position in the strut 8, and tightened with the locknut 30. The same principle apply applies to the strut 8 and the upper portion 29 of the U-joint 23. The U-joint 23 will as a consequence be of a larger diameter in FIG. 5 than in FIG. 4.

Figure 6:
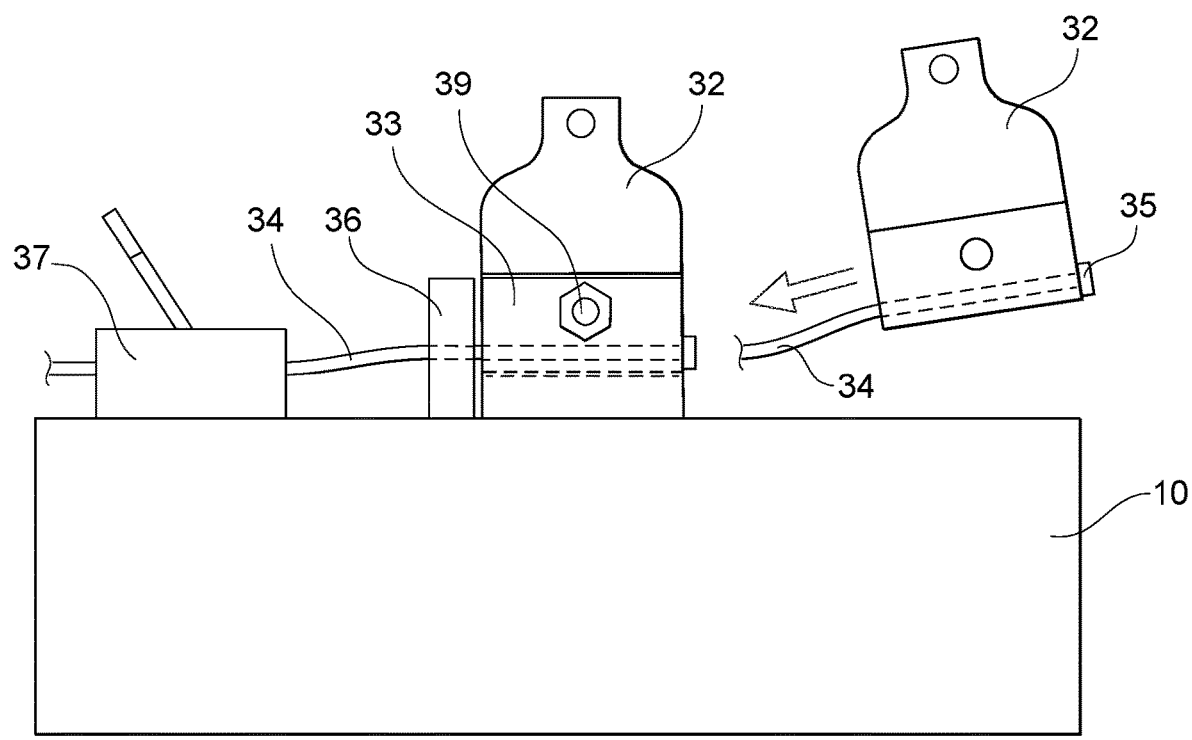
FIG. 6 shows a connection to the mooring as well as the installation principle with a wire rope winch. This view is turned 90 degrees from the view of FIG. 4.

In both options, a lower portion 32 of the U-joint 23, will be attached to the mooring weight 10 in a practical manner. All above mentioned parts will preferably be installed before being towed to the final location. At location there will some small movements due to waves, but being largely helped by placing the platform 2 with the short end towards the waves. Divers will be in contact with deck crew to position the lower portion 32 of the U-joint 23, into a block 33, see FIG. 6. A wire 34 may run through the lower portion 29, with a locking nut 35 on the end. (The nut 35 may instead be two coned halves pressed together around the wire, then positioned in a fitting cone in the block 33). The nut 35 as well as the wire 34 will be removed after installation. A guiding bracket 36, with a wire hole in it, will guide the lower portion 29 towards its final position. A manual wire rope winch 37 will be used to pull the wire. The slight movement up and down in the waves will further help to position the parts together. The fitting between the lower portion 29 and block 33 will be tight. When in approximate position a bolt 38, which is cone shaped, will be hammered in position for the final fixed setting. A locknut 39 will ensure that the bolt 38 stays in position. FIGS. 4 and 6 are respectively 90 degrees in relation to the other.

The above are two options for connecting and installing the system in a practical manner. Other solutions are possible, for instance clamshell, flexible joints and pulleys, as well as the abovementioned solution with a vertical tower like strut from the sea floor mooring. One may also omit the strut 8 and the U-joint 23 as depicted, and instead directly integrate the upper portion 29 of the U-joint 23 in the lower part of the piston rod. The lower part 32 of the U-joint 23 may also be directly integrated in the block 33, so as to have less parts. The principle of the patent remains the same.

One option is as well to make the sea floor mooring shaped like a round ball 29 underneath, omitting the joint 23 and instead having the slight rotation forth and back happen towards the sea floor itself. Instead of using only the sea floor as the ground for this, susceptible to creating a hole, a concrete or metal floor 30, on which the round mooring rolls forth and back, would be a possible solution.

Figure 8:
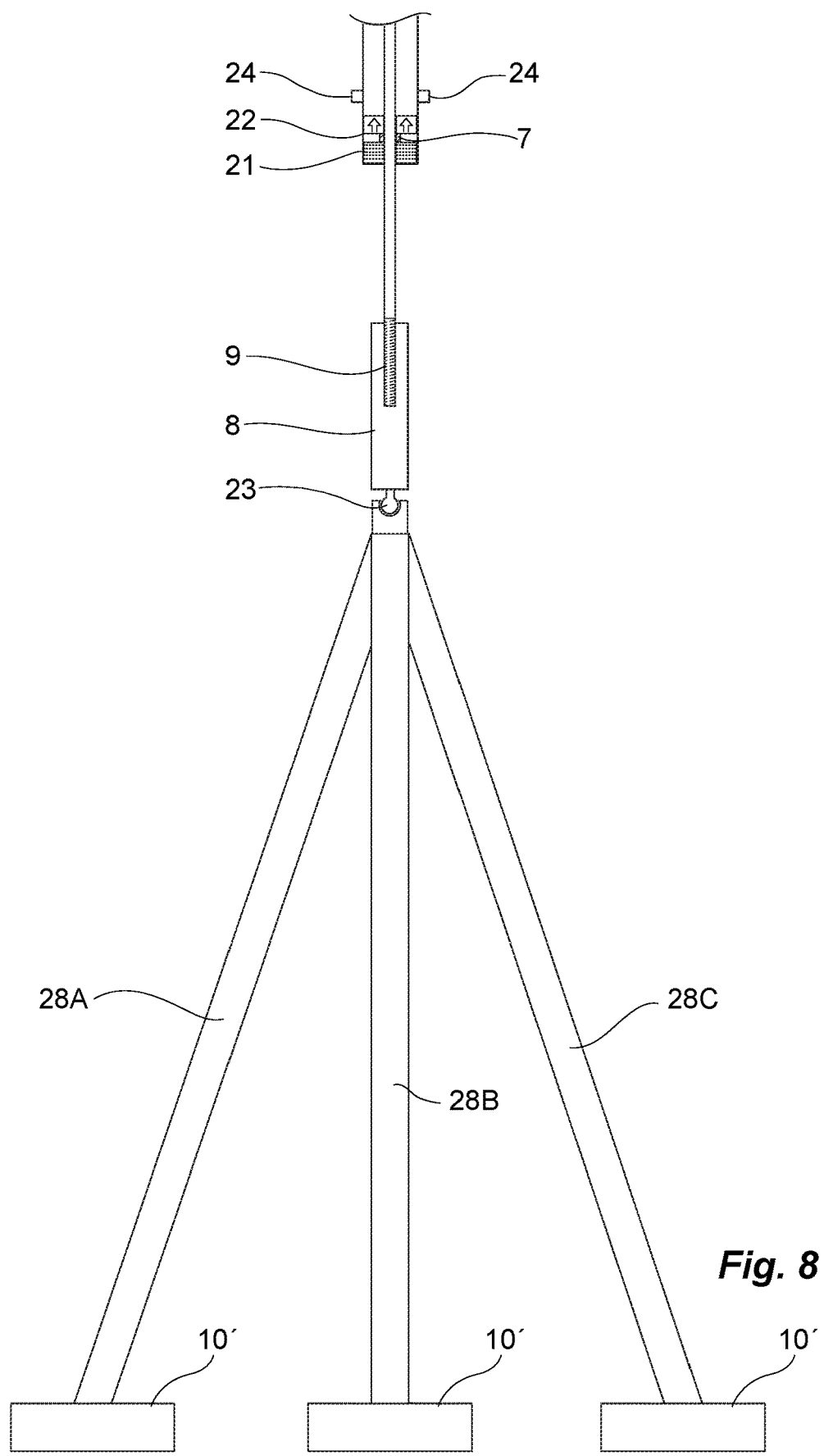
FIG. 8 shows an embodiment of a lower portion of a piston rod and its connection to a mooring of another type.
Figure 9:
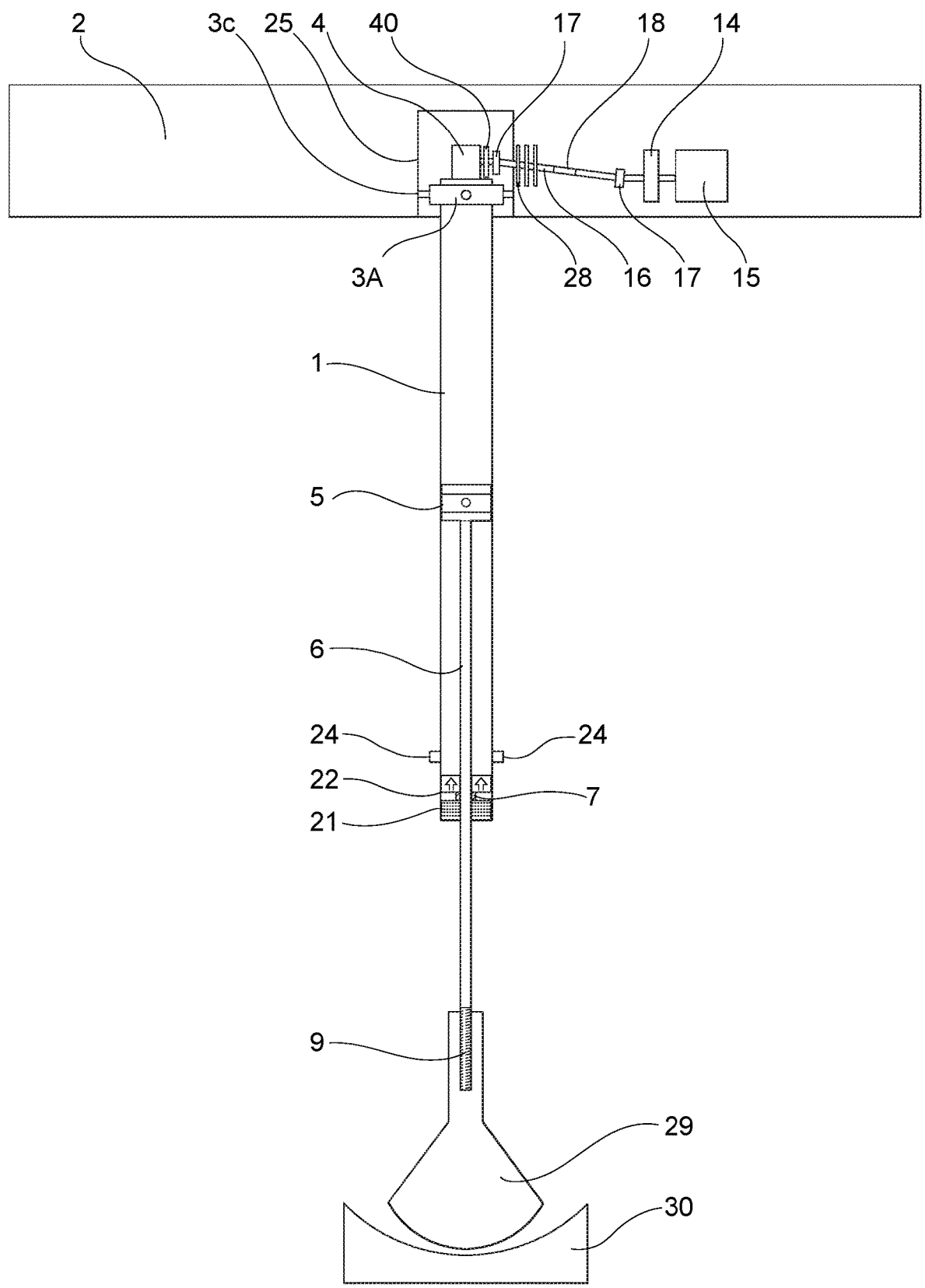
FIG. 9 shows another embodiment of mooring of the embodiment of the present invention in FIG. 7, seen from a long side.

At deeper water depths, buckling of the piston rod 6 will be a concern, even with use of the strut 8 for extension. This may be avoided by having a separate thicker and more solid rod, extending up from the mooring 10', thereby heightening the joint 23 to a more suitable level. This lower rod may have various shape, like for instance a tripod 28, see FIG. 8. The effect will be of simulating a raising of the seafloor to a lower depth, using a tower like construction up from the bottom. In this way, one can use the same length and width of the piston rod 6 for all installation depths, if so wanted. The main advantage is though that the concept may be installed outside countries where the waters are very deep, like Japan. In FIG. 8 the three legs are depicted as 28A, 28B and 28C. They are provided in a triangle position when seen from above. The moorings 10' will be placed on the seafloor.

For towing from construction site to final location, depth and drag is a consideration. One option is to transport the cylinder 1 and systems lying flat on top of the platform, then having a crane equipped ship lift it into place.

Another option is to lift the cylinder for instance halfway up for transport, and then, possible with an on-board crane, lower it into position.

A third option is to have the cylinder 1 floating in the water, at location have it installed from below. The Pelton Turbine may or may not be in the water as well, depending of practicality regarding connections for hydraulics and electrics.

Electricity to run the systems can be tapped from the generator and via a converter be led to a battery, supplying the systems. Alternatively, a small simple wind power unit may as well supply the battery with sufficient power, as the periods with zero winds at sea are quite short.

In any technical system, there are risks of parts failing or shearing. Besides the overpressure valves 24 mentioned above, more safety components may or should be installed. These may include explosive cartridges or weaker points to break off the piston rod 6 or the swivel arrangement 3 in case of piston seizing. Similar solutions could be applied to some of the mooring chains so as to move the platform laterally from the location, thereby avoiding parts colliding more than necessary in the event of a shear or parts being stuck. Likewise control features that dumps the pressure via the overpressure valves 24, either to avoid the maximum bar pressure to be exceeded, or to totally dump the pressure in case of some defined malfunctions. Warning sensors connected to fire suppressant systems as well as bilge pumps will be of relevance as well. Without listing all options, similar conservative set-ups as in shipping and aviation is what will be needed, especially in the larger and costlier versions of this platform and power take-off concept.

The invention claimed is:

1. An apparatus for harvesting energy from waves, of the wave energy converter type being a point absorber, comprising a floating platform, a cylinder connected thereto and arranged underneath the floating platform, and a piston having a piston rod arranged to be connected to a mooring at the sea floor, wherein at least one penstock tube is in fluid connection at its lower end with a lower portion of the cylinder, below the piston, the at least one penstock tube being provided along the cylinder and has an opening at the upper end facing a water turbine arranged above the cylinder, the water turbine being in connection with a generator, wherein the cylinder has at least one opening in the lower portion thereof and provided with a one-way valve arranged to allow water into the lower portion of the cylinder when the cylinder moves downwards and thus the piston moves upwards relative the cylinder, wherein the cylinder has at least one opening in an upper portion of the cylinder arranged to allow water into the upper portion of the cylinder when the cylinder moves upwards and thus the piston moves downwards relative the cylinder, and wherein the upper opening of the at least one penstock tube further comprises one or more adjustable nozzles arranged to regulate the pressure and the speed of water exiting the at least one penstock tube.

2. The apparatus according to claim 1, wherein the cylinder is connected via a swivel coupling to the floating platform.

3. The apparatus according to claim 1, wherein the at least one opening in the upper and/or lower portion of the cylinder is provided with a screen.

4. The apparatus according to claim 1, wherein the fluid connection between the cylinder and the at least one penstock tube comprises at least one one-way valve arranged to allow water to flow from the cylinder to the at least one penstock tube.

5. The apparatus according to claim 1, wherein at least two penstock tubes are provided on opposite sides of the cylinder.

6. The apparatus according to claim 5, wherein the water turbine is arranged with a horizontal axis of rotation, and wherein the upper openings of the at least two penstock tubes are provided at different levels so that at least one first opening at a first side of the water turbine faces buckets at the top of the water turbine and at least one second opening at a second side of the water turbine faces buckets at the bottom of the water turbine, or vice versa.

7. The apparatus according to claim 1, wherein the water turbine is arranged with a vertical axis of rotation.

8. The apparatus according to claim 1, wherein the at least one penstock tube has a valve with a cutoff/on function, such as a spear valve in its upper opening.

9. The apparatus according to claim 1, wherein the at least one penstock tube has a pressure valve in its upper opening.

10. The apparatus according to claim 9, wherein the pressure valve is adapted to open when a predetermined pressure is obtained.

11. The apparatus according to claim 1, wherein the water turbine is a Pelton turbine.

12. The apparatus according to claim 1, wherein a coupling is provided between the water turbine and the generator.

13. The apparatus according to claim 1, wherein a flywheel is provided between the water turbine and the generator.

* * * * *